United States Patent
Figura

(10) Patent No.: US 9,771,995 B2
(45) Date of Patent: Sep. 26, 2017

(54) SILENT BLOCK

(75) Inventor: Michael Georg Figura, Dormagen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1684 days.

(21) Appl. No.: 12/186,629

(22) Filed: Aug. 6, 2008

(65) Prior Publication Data

US 2009/0051088 A1 Feb. 26, 2009

(30) Foreign Application Priority Data

Aug. 20, 2007 (EP) .................................. 07114615

(51) Int. Cl.
*F16F 7/00* (2006.01)
*F16F 1/376* (2006.01)
*F16F 1/44* (2006.01)

(52) U.S. Cl.
CPC ............... *F16F 1/376* (2013.01); *F16F 1/44* (2013.01)

(58) Field of Classification Search
CPC ............ F16F 1/3732; F16F 1/376; F16F 1/44
USPC .................................. 267/152, 153, 193
See application file for complete search history.

(56) References Cited

U.S. PATENT DOCUMENTS

| | | | |
|---|---|---|---|
| 2,465,790 A | 3/1944 | Campbell | |
| 3,879,024 A | 4/1975 | Scott et al. | |
| 5,123,625 A * | 6/1992 | Spaltofski | 248/634 |
| 5,232,061 A * | 8/1993 | Neeleman | 177/184 |
| 5,295,671 A | 3/1994 | Nakagaki et al. | |
| 5,651,561 A | 7/1997 | Tandy, Jr. et al. | |
| 5,725,203 A * | 3/1998 | Lloyd | 267/153 |
| 5,845,895 A | 12/1998 | Nakada et al. | |
| 6,113,084 A * | 9/2000 | Norkus et al. | 267/292 |
| 6,749,040 B1 | 6/2004 | Menjak et al. | |
| 7,156,212 B1 | 1/2007 | Ciotti et al. | |
| 7,270,341 B2 | 9/2007 | Longworth et al. | |
| 7,293,787 B2 | 11/2007 | Nunez et al. | |
| 2004/0113339 A1* | 6/2004 | Masterson et al. | 267/153 |

FOREIGN PATENT DOCUMENTS

| | | |
|---|---|---|
| DE | 1727095 | 7/1956 |
| DE | 3135043 | 3/1983 |
| DE | 3524791 | 1/1987 |
| DE | 3742585 | 3/1989 |
| DE | 4237428 | 5/1993 |
| DE | 202004010409 | 9/2004 |
| EP | 0984197 | 3/2003 |
| EP | 1526212 | 4/2005 |
| GB | 602256 | 5/1948 |

OTHER PUBLICATIONS

English Abstract of DE 202004010409.
English Abstract of DE 3135043.
English Abstract of DE 3524791.
English Abstract of DE 3742585.
English Abstract of DE 4237428.

* cited by examiner

*Primary Examiner* — Xuan Lan Nguyen
(74) *Attorney, Agent, or Firm* — Jones Robb, PLLC; Raymond L. Coppiellie

(57) ABSTRACT

A silent block comprises a first basic element and a rubber body at least partially surrounding the first basic element. The rubber body has, on its bearing side oriented toward a fastening side, at least one projection that projects beyond the bearing side in a direction of the fastening side.

24 Claims, 2 Drawing Sheets

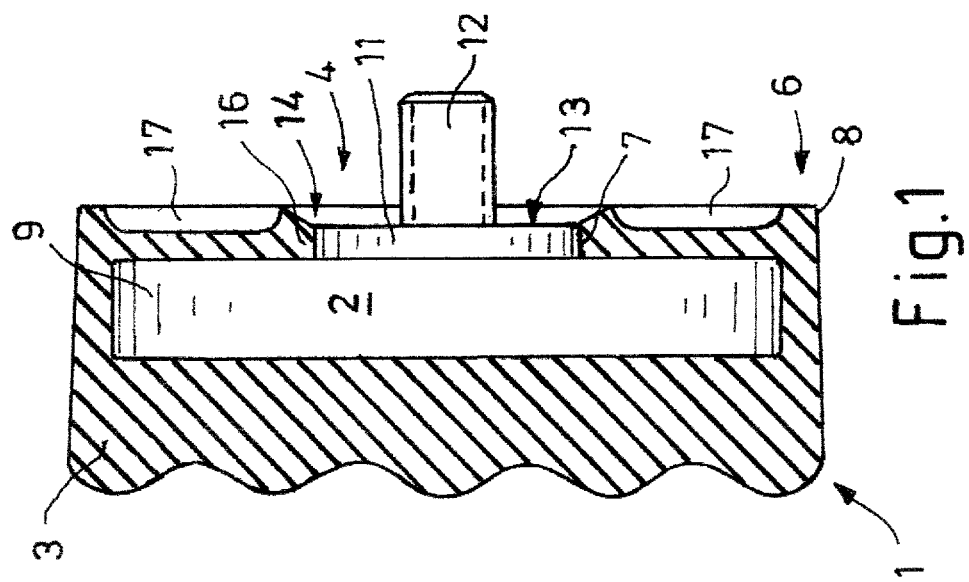
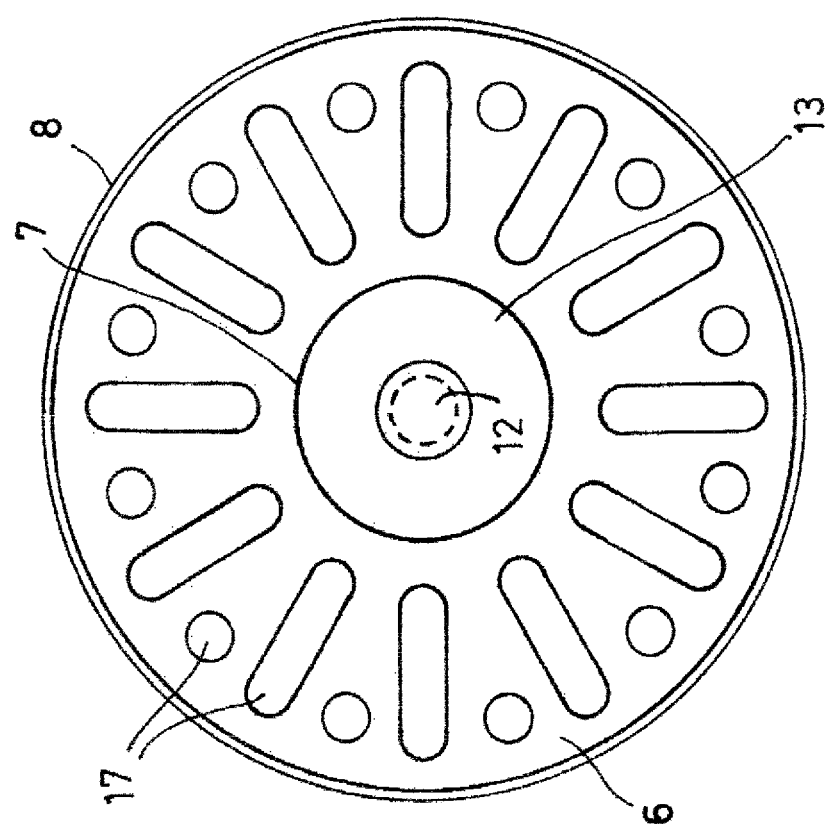

SILENT BLOCK

INTRODUCTION

This application claims priority to European Patent Application No. EP07114615, filed Aug. 20, 2007, the disclosure of which in incorporated by reference herein in its entirety.

FIELD OF THE INVENTION

The invention relates to a silent block, also referred to as a vibration insulation mount, with a first basic element and a rubber body surrounding the first basic element.

BACKGROUND OF THE INVENTION

Silent blocks are used, for example in the automobile industry, to reduce the generation of noise that can be transmitted to a vehicle interior. For example, silent blocks can be used for vibration insulation on steering lines, air-conditioning system lines, and vacuum lines, for example to insulate the lines when fastened to a body of the vehicle. Use of silent blocks in a vehicle suspension is disclosed, for example, in U.S. Pat. Nos. 7,293,787, 7,270,341, and 5,651,561. Use of silent blocks in disk brakes is disclosed in U.S. Pat. No. 7,156,212. Use of silent blocks in rack and pinion steering is disclosed in U.S. Pat. No. 6,749,040.

Silent blocks conventionally have a base plate received in a rubber block, as described, for example, in DE 3524791 A1, which discloses a rubber-metal buffer. The rubber-metal buffer has a rubber body with two connecting parts, each of which is connected to the rubber body. A thread-free bolt for fastening to associated components is provided on each of the two connecting parts. The base plate is surrounded laterally by a circumferential part.

Silent blocks are also disclosed in DE 3135043 A1, DE 3742585 C1, DE 4237428 A1 (which corresponds to U.S. Pat. No. 5,295,671), DE 202004010409 U1, DE 1727095 U, EP 0984197 B1, GB 602,256 (which corresponds to U.S. Pat. No. 2,465,790), U.S. Pat. No. 3,879,024 and U.S. Pat. No. 5,845,895.

EP 1526212 A2 (corresponding to U.S. Patent Publication No. 2005/081577) discloses a washing machine with feet having vibration-absorbing parts consisting of rubber. A first vibration-absorbing part is in contact with a standing surface. A second vibration-absorbing part is arranged higher than the first vibration-absorbing part with respect to the standing surface. The two vibration-absorbing parts are separated from one another by a groove.

Silent blocks in a round or angular configuration require additional tools for fastening to prevent the silent block from twisting and allow it to maintain its mounting position. It is possible, however, to provide the silent block or base plate with a device for increasing friction to counteract twisting during fastening (usually screwing). Friction can be increased by utilizing a profiled surface on a contact side of the base plate with a corresponding fastening component. For example, the contact side of the base plate could be scored to generate a tooth-like profile that penetrates, with an increasing fastening force, into a corresponding opposite side. However, this can cause the corresponding component to be damaged on its surface, which can in turn increase the risk of corrosion. The useful life of the corresponding component may consequently be reduced considerably.

SUMMARY

The present teachings provide a silent block comprising a first basic element and a rubber body at least partially surrounding the first basic element. The rubber body has, on its bearing side oriented toward a fastening side, at least one projection that projects beyond the bearing side in a direction of the fastening side.

The present teachings also provide a method for forming a silent block. The method comprising casting a rubber body around a basic element. The rubber body is cast to have, on its bearing side oriented toward a fastening side, at least one projection that projects beyond the bearing side in a direction of the fastening side.

Additional aspects of the present teachings will be set forth in part in the description which follows, and in part will be obvious from the description, or may be learned by practice of the invention. Certain objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the present teachings and together with the description, serve to explain the principles of the invention.

BRIEF DESCRIPTION OF THE DRAWINGS

FIG. 1 illustrates a cross section through an exemplary embodiment of a silent block in accordance with the present teachings;

FIG. 2 illustrates a top view of a bearing side of the silent block embodiment of FIG. 1.

DESCRIPTION OF EXEMPLARY EMBODIMENTS

Figure 3:
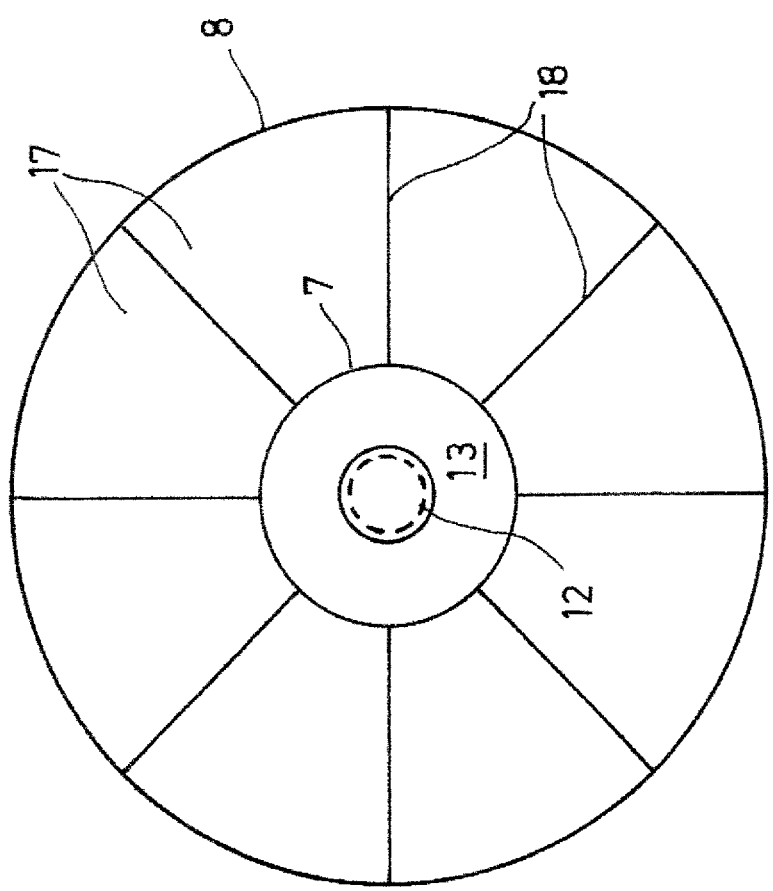
FIG. 3 illustrates a top view of a bearing side of an exemplary embodiment of a silent block having projections appearing as a sliced cake.

Reference will now be made in detail to various embodiments of the present teachings, examples of which are illustrated in the accompanying drawings. Wherever possible, the same reference numbers will be used throughout the drawings to refer to the same or like parts.

Various embodiments of the present teachings provide an improved silent block wherein a rubber body has, on its bearing side oriented toward a fastening side of a first basic element (which may be, for example, a flange), one or more projections that project beyond the bearing side in a direction of the fastening side. A plurality of projections can include a radially inner projection and a radially outer projection that is spaced from the radially inner projection in a radial direction.

The one or more projections can form bearing lips that, oriented toward the fastening side of the basic element, project beyond the bearing side of the rubber body. When the first basic element is being fastened (e.g., screwed) to a corresponding component, the projections come to bear against a contact face of the corresponding component to increase a frictional resistance to prevent twisting or vibrating of the silent block out of its mounted position.

Since the projections are pressed down toward the rest of the rubber body during contact with the contact face and an increasing fastening force, certain embodiments of the present teachings provide expansion spaces on the bearing side of the rubber body, into which spaces the projections can be deflected when pressed during fastening. In various exemplary embodiments, the expansion spaces have elongated shapes as illustrated in FIG. 2, but may also have a circular shape as also illustrated in FIG. 2. The present teachings contemplate a variety of sizes, shapes, and number of expansion spaces, as desirable to accommodate the pressed projections upon fastening. The projections can surround the expansion spaces.

In certain exemplary embodiments, the bearing side of the rubber body has expansion spaces and projections arranged to look like slices of cake, a radially inner projection being connected to a radially outer projection via connecting projections. The connecting projections can be shaped as spokes, having the same effect as the inner and outer projections.

In certain embodiments of the present teachings, the rubber body has a central recess on its bearing side, the inner circumference of the central recess being radially spaced from a mid-axis of the silent block.

In certain embodiments, the rubber body can include a key face on an outer circumference of the bearing side. The key face can have a hexagonal shape to facilitate engagement by an open-ended wrench or pliers.

In certain embodiments, the basic element comprises a base plate having at least one stepped, elevated clamping portion on its fastening side. One skilled in the art will understand that more than one step can be provided, or the clamping portion can be divided into a plurality of face portions. Further, the basic element can have a threaded bolt on its fastening side for connection to a corresponding nut. The clamping portion, when elevated in a step-like manner, can be provided in a central region of the base plate to provide a hard surface for contact between the base plate and a corresponding holding device or opposite contact face. Providing a hard surface for contact prevents the rubber body from being excessively compressed and, over the life of the vehicle, prevents the clamping force from decreasing due to degradation of the rubber since no rubber is present in the clamping gap.

In certain embodiments of the present teachings, the basic element comprises a single part. The present teachings also contemplate the basic element having a multipart construction wherein the individual components are sufficiently connected to one another.

In accordance with various embodiments of the present teachings, the rubber body can be cast around the basic element, for example using casting molds, so that the base plate is completely or partially surrounded by the rubber body or is embedded securely in position in the latter. The present teachings also contemplate embodiments wherein the rubber body is vulcanized onto the basic element, the basic element being formed from a suitable material preferably consisting of a metal. The present teachings further contemplate embodiments where a straightforward form fit such that a vulcanizable material pairing need not be made.

The base plate can have, on its outer circumference, a key face that is integrally cast or is surrounded by the rubber body.

In accordance with certain embodiments, the clamping portion can be circumferentially surrounded, on its fastening side, by the rubber body, and a free clamping portion can come into direct contact with a corresponding connecting component.

In certain embodiments, the silent block comprises two or more basic elements, which hay be identically designed, which are surrounded by the rubber body in the way described above. Similarly, the rubber body can have two or more identical, diametrically-opposite bearing sides with projections.

Components connected via a silent block of the present teachings, which are to be separated from one another in terms of vibration, can include, for example, a power assistance line of a steering system or an intermediate holder of a body or the body itself, although these examples are, of course, not intended to be restrictive.

An exemplary power assistance line can have an auxiliary device, for example a clip having a hole adapted for the threaded bolt. The same may apply to the corresponding connecting component. In an embodiment having two basic elements, the basic elements can be produced beforehand, for example with the rubber body cast around them to form the silent block. Via the threaded bolts, the silent block is mounted between the two connecting components for vibrational separation from one another, corresponding nuts being screwed onto the threaded bolts. When the nuts are screwed tight, the projections first come into contact with the corresponding connecting component, increasing the frictional resistance. With a growing fastening force of the nuts, the projections are increasingly pressed together and the lateral beads that occur are deflected into the expansion spaces. Moreover, the expansion spaces prevent excessive compression of the bearing side of the rubber body. Further, the free clamping portion can come into contact with the corresponding contact face and can function as a tightening obstacle so that the rubber body is not compressed excessively on its bearing face.

Due to the increased friction resistance, the clamping portion can be designed without a tooth-like profile and can thus prevent corrosion caused by pressing a tooth-like profile against the corresponding contact face. When both nuts are tightened sufficiently, the two components are connected via the silent block, but are nevertheless vibrationally insulated from one another. The projections not only can increase the frictional resistance during fastening, but also can act as a seal to prevent penetration of water between the two connecting components. The risk of corrosion is consequently further reduced.

FIG. 1 shows a cross section through a silent block 1 with a first basic element 2 surrounded by a rubber body 3 having projections 7 and 8 on its bearing side 6, oriented toward a fastening side 4. As shown in FIGS. 1 and 2, a radially inner projection 7 is radially spaced from a radially outer projection 8.

FIG. 1 is a partial cross sectional view of a silent block 1 in accordance with the present teachings. The portion of the silent block cross section that is not illustrated may comprise, for example, a partial section substantially identically to that illustrated.

In accordance with various embodiments of the present teachings, the basic element 2 can include a base plate 9, of which the fastening side 4 has adjoining it at least one clamping portion 11 that is elevated in a step-like manner and to which a threaded bolt 12 is assigned centrally. The basic element 2 can have a one-piece construction.

The rubber body 3 is cast around the basic element 2, which can comprise a metal. The base plate 9 can be securely embedded in the rubber body 3. The elevated clamping portion 11 projects with a free clamping face 13 out of the rubber body 3 or a central recess 14 arranged in the middle of the rubber body, and can be surrounded only circumferentially at a step 16 by the rubber body 3. The threaded bolt 12 can be completely free of rubber. The present teachings contemplate vulcanizing the rubber body 3 onto the basic element 2, and also contemplate a straightforward form fit of the rubber body 3, so that vulcanizable material pairing could be ignored.

As illustrated in FIG. 2, a bearing side 6 of the rubber body 3 has expansion spaces 17 into which the projections, when pressed during attachment, can be deflected. In accordance with various embodiments, the expansion spaces 17 can include a variety of shapes, sizes and numbers, such as the illustrated alternating long hole and circular shapes. The expansion spaces 17 can prevent excessive compression of the rubber body 3 on its bearing side 6.

FIG. 3 illustrates an exemplary embodiment of a silent block, a bearing side 6 thereof being shown. In this exemplary embodiment, expansion spaces 17 can be arranged such that in the top view they appear as slices of a cake. The radially inner projection 7 can be connected to the radially outer projection 8 via connecting projections 18 designed similar to wheel spokes and causes the same frictional effect as the inner and the outer projections 7 and 8.

The rubber body 3 for insulating two connecting components from one another can not only fill the space between the two connecting components, but can also surround the basic element 2 except for its free clamping face 13 and the threaded bolt 12. In certain embodiments, the bearing side 6 can be provided with an inner ring (inner projection 7) and an outer ring (outer projection 8) that increase frictional resistance during fastening and act as sealing lips to prevent penetration of media, for example water, to the contact partners. The contact face is thereby sealed off to prevent corrosion. In accordance with various exemplary embodiments of the present teachings, the silent block 1 can be used for vibrational insulation of power assistance lines of a steering system with respect to a vehicle body, and can be used for a variety of other purposes where vibration damping is desirable.

While the present teachings have been disclosed in terms of exemplary embodiments in order to facilitate better understanding of the invention, it should be appreciated that the invention can be embodied in various ways without departing from the scope of the invention. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A silent block comprising:
   a first basic element including a threaded bolt;
   a rubber body at least partially surrounding the first basic element, the rubber body having a bearing side having a bearing surface oriented toward a fastening side of the silent block;
   a radially inner projection and a radially outer projection on the bearing side of the rubber body, each of the radially inner projection and the radially outer projection projecting outwardly away from the bearing surface of the rubber body in a direction of the fastening side, the radially inner projection being circular and surrounding the threaded bolt and the radially outer projection being spaced from the radially inner projection in a radial direction and surrounding the radially inner projection, the radially outer projection being substantially concentric with the radially inner projection;
   radially extending connecting projections projecting outwardly away from the bearing surface of the rubber body, the radially extending connecting projections extending from the radially inner projection to the radially outer projection, and being spaced along a circumference of the bearing surface; and
   expansion spaces on the bearing side of the rubber body, the expansion spaces comprising recesses located between adjacent connecting projections and between the radially inner projection and the radially outer projection.

2. The silent block of claim 1, wherein the first basic element has a free clamping face oriented toward the fastening side of the silent block and extending between the threaded element and the inner projection.

3. The silent block of claim 2, wherein the radially inner projection and the radially outer projection extend outwardly beyond the free clamping face in a direction of the fastening side of the silent block.

4. The silent block of claim 3, wherein the radially inner projection on the bearing side of the rubber body runs adjacent to an outer edge of the free clamping face of the rubber body.

5. The silent block of claim 4, wherein the radially outer projection on the bearing side of the rubber body extends to an outer edge of the rubber body.

6. The silent block of claim 5, wherein the radially extending connecting projections span substantially the entire distance from the outer edge of the free clamping face to the outer edge of the rubber body.

7. The silent block of claim 2, wherein the expansion spaces extend inwardly beyond the free clamping face in a direction opposite to the fastening side of the silent block.

8. The silent block of claim 1, wherein the rubber body has a central recess, the inner circumference of the central recess being spaced radially from a mid-axis of the silent block.

9. The silent block of claim 1, wherein the basic element comprises a base plate, a fastening side of the base plate adjoining a clamping portion that is elevated in a step-like manner, and wherein a threaded bolt is assigned centrally to the clamping portion.

10. The silent block of claim 1, wherein the basic element is produced in one part.

11. The silent block of claim 1, wherein the basic element is produced in a multipart fashion.

12. The silent block of claim 1, wherein the rubber body is cast around the basic element.

13. The silent block of claim 1, wherein the bearing side of the rubber body is configured to increase friction to counteract twisting caused when the silent block is screwed into place.

14. The silent block of claim 1, wherein the bearing side of the rubber body is configured to provide both vibration insulation and sealing.

15. The silent block of claim 1, wherein the radially inner projection forms a continuous circumferential portion that surrounds the threaded bolt.

16. The silent block of claim 15, wherein the threaded bolt is located within the continuous circumferential portion of the radially inner projection.

17. The silent block of claim 1, wherein the radially outer projection is circular.

18. The silent block of claim 17, wherein the radially outer projection forms a continuous circumferential portion.

19. A silent block comprising:
   a basic element including a base plate and a threaded bolt;
   a rubber body at least partially surrounding the basic element, the rubber body having a bearing side oriented toward a fastening side of the silent block, wherein at least an edge of the plate and a side of the plate opposite the threaded bolt is completely embedded in the rubber body, the threaded bolt extending from a fastening side of the silent block; and
   a radially inner projection and a radially outer projection projecting from the bearing side of the rubber body, the radially inner projection being circular and surrounding the threaded bolt and the radially outer projection surrounding the radially inner projection and being substantially concentric with the radially inner projection.

20. The silent block of claim 19, wherein the basic element further comprises a clamping portion positioned between the base plate and the threaded bolt.

21. The silent block of claim 20, wherein the clamping portion extends through a recess in the rubber body.

22. The silent block of claim 19, wherein the base plate is metal.

23. The silent block of claim 19, further comprising a plurality of radially extending connecting projections projecting from the bearing side of the rubber body, the radially extending connecting projections extending from the radially inner projection to the radially outer projection.

24. The silent block of claim 23, further comprising expansion spaces on the bearing side of the rubber body, the expansion spaces comprising recesses located between adjacent connecting projections and between the radially inner projection and the radially outer projection.

* * * * *